April 28, 1970  D. N. BROOKS  3,508,478
PHOTOGRAPHIC FLASHLAMP UNIT
Filed June 26, 1967

DAVID N. BROOKS
INVENTOR

BY Joseph C Ryan
ATTORNEY

United States Patent Office 3,508,478
Patented Apr. 28, 1970

3,508,478
PHOTOGRAPHIC FLASHLAMP UNIT
David N. Brooks, West Peabody, Mass., assignor to Sylvania Electric Products, Inc., a corporation of Delaware
Filed June 26, 1967, Ser. No. 648,592
Int. Cl. G03b *17/48, 15/03*
U.S. Cl. 95—11                            4 Claims

ABSTRACT OF THE DISCLOSURE

A photographic flashlamp unit having a base member with a plurality of apertures therein, a mounting element depending from the base member for connecting the unit to a camera socket, a plurality of flashlamps supported on the base member, and a retaining device for releasably holding the base member in the mounted position on the camera. The flashlamps are of the percussive primer type which have their percussive primers extending into the apertures on the base member. The retaining device is formed by an annular ring which depends from the base member and has apertures therein for cooperating with a pin mechanism on the camera to releasably retain the flashlamp unit in a predetermined position in the camera socket.

---

This invention relates to the manufacture of multi-lamp photographic flashlamp units, commonly called flashcubes, and the type of lamps which may be employed therewith.

Generally speaking, most commercial photoflash lamps on the market today comprise an hermetically sealed envelope enclosing a combustible, a combustion-supporting gas and an ignition system. The hermetically sealed envelope is usually a short length of drawn glass tubing having an exhaust tip at one end and an external press at the other end. The combustible is usually shredded foil, such as filamentary zirconium for example, and the combustion-supporting gas is usually principally oxygen. The ignition system usually comprises a pair of spaced lead-in wires sealed in and extending through the press, a tungsten filament bridging the spaced lead-in wires at or near the inner ends thereof, and a body of fulminating material disposed on the inner tips of the lead-in wires and the segments of the filament immediately adjacent thereto.

The camera or flashguns with which these lamps are used are provided with a suitable socket or receptacle to receive them. The socket usually includes means for physically supporting the lamp in position and means for electrically connecting the lamp to a power source disposed within the camera or the flashgun. The segments of the lead-in wires disposed outside the sealed lamp envelope are usually shaped to define lamp electrical contacts. When a lamp is placed in the socket provided therefore, the lamp electrical contacts are disposed in cooperative engagement with socket electrical contacts. The socket electrical contacts are connected by wires to a power source, usually a pair of dry cell batteries located in a chamber provided therefor in the camera or the flashgun.

Energization of the ignition system of the flashlamp is effected by actuation of the shutter release of the camera. Most cameras are usually provided with some form of shutter release member located on the top of the camera. When a photographer depresses or otherwise actuates this shutter release member to "snap" a picture, he also, by this same operation, closes the electrical circuit from the batteries to the ignition system in the lamp to thereby flash the lamp. The timing of the ignition of the combustible material in the lamp is synchronized with the exposure of the film by actuation of the shutter release so that efficient utilization of the light from the flashed lamp may be obtained.

One of the most chronic problems and perhaps most exasperating circumstance with which the average amateur photographer is confronted is weak batteries—batteries too weak to fire the lamp. The average amateur photographer will usually have a spare flash lamp or two but rarely if ever will he have a pair of spare fresh batteries. Thus a single shot, or more probably a whole sequence of shots will be lost. Dry cell batteries, by their very nature, tend to lose their strength gradually over an extended period of time. Many amateur photographers take flash pictures less than half a dozen times a year, thus providing more than enough time between uses for the batteries to deteriorate from strong to weak—from operativeness to inoperativeness.

In view of the foregoing, one of the principal objects of this invention is to provide a flashlamp having an ignition system which does not require batteries as a power source to effect ignition of the combustible; and another object is to provide a flashcube with lamps of this type.

These and other objects, advantages and features are attained, in accordance with the principles of this invention, by providing a flashlamp with an ignition system of the percussive primer type, and providing a flashcube base or platform with means for receiving and supporting these lamps in such a manner that each lamp in the flashcube will be securely and accurately positioned on the camera for successive firing thereof.

In the specific embodiment of the invention illustrated in the accompanying drawing, FIGURE 1 is an elevational view of a photoflash lamp of the percussive primer type.

Figure 1:
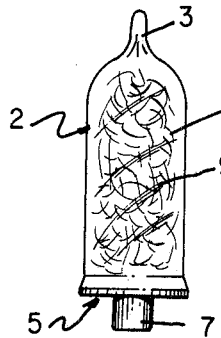

The flashlamp 2 of FIGURE 1 comprises an hermetically sealed, light-transmitting, substantially tubular envelope 1 having an exhaust tip 3 defining one end thereof and having a percussive primer 5 secured thereto at the other end thereof. The percussive primer 5 comprises a cup or container 7 within which an anvil and a quantity of percussion powder are disposed. The envelope 1 contains a filling of a combustible, such as filamentary zirconium 9 for example, and a combustion-supporting gas such as oxygen at several atmospheres pressure.

Figure 2:
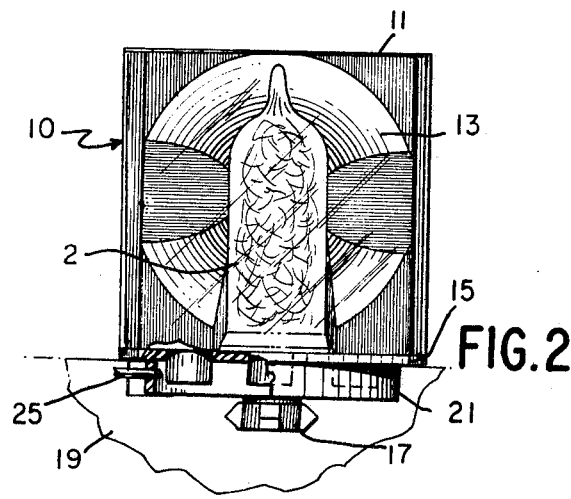
FIGURE 2 is an elevational view of a flashcube, partly in section showing particularly the way in which it may be locked in position on a camera.

The flashcube 10 of FIGURE 2 is provided with the lamp 2 of FIGURE 1. The flashcube 10 comprises a transparent container 11 within which a plurality of lamps 2, each with its own reflector 13, are disposed. The lamp-reflector assemblage is supported on a platform or base 15 and the container 11 is secured thereto. Like the present commercial flashcube, the base 15 is provided with a depending, cylindrical center post or spindle 17 for supporting and retaining the flashcube in a receiving socket of a camera 19.

Figure 3:
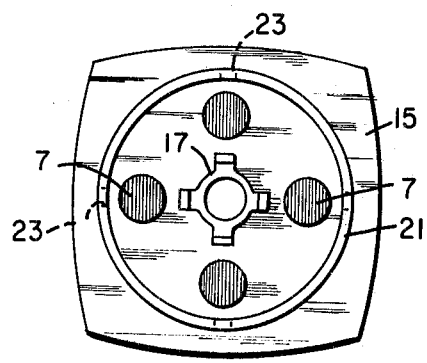
FIGURE 3 is a bottom plan view of the flashcube of FIGURE 2.

As is shown particularly in FIGURES 2 and 3, the base 15 is provided with a plurality of apertures therein, through which the cups 7 of the flashlamps 2 extend, and a depending annular ring 21 which circumscribes the depending cups 7. The ring 21 is provided with a plurality of apertures 23 therein, each aperture being aligned with a cup 7 of a flashlamp 2. The camera 19 is provided with a locking pin 25 which is actuated by suitable means in the camera, not shown, to effect its reciprocation into and out of one of the apertures 23 in the ring 21.

In the operation of the present commercial flashcube, the flashcube is rotated automatically by means of a suitable mechanism which connects the shutter release of the camera to the spindle 17 of the flashcube. Since the lamps of the present commercial flashcube use an electric primer whereas the lamps employed with the flashcube of this invention use a percussive primer, the requirements of the former are much less rigid than the requirements of the latter insofar as accurately positioning the flashcube after each index thereof and securing it in that position are concerned.

The flashlamp in firing position must be accurately located therein in order to make sure that the blow, delivered by the striker located in the camera, against the cup 7 of the percussive primer 5 will be sure to set off the percussion powder disposed therein. The flashcube in firing position must be securely held therein during firing to overcome the force tending to displace it exerted by the blow of the striker against the cup. These requirements are met by the locking arrangement provided by the locking pin 25 in the camera engaging one of the apertures 23 in the ring 21.

What I claim is:

1. A photographic flashlamp unit for use with a camera having a socket for receiving said unit, said unit comprising: a platform having a plurality of apertures therein; a plurality of flashlamps of the percussive primer type supported on said platform with the percussive primers thereof extending into said apertures; mounting means depending from said platform for connecting it to said camera socket; and retaining means, separate from said mounting means, for releasably holding said platform in mounted position on said camera.

2. The combination of claim 1 in which said retaining means comprises an annular ring depending from said platform.

3. The combination of claim 1 in which said retaining means comprises an annular ring depending from said platform and having means cooperative with means in said camera to effect said retention.

4. The combination of claim 1 in which said retaining means comprises an annular ring depending from said platform, said ring having apertures therein disposed in cooperative relationship with respect to pin means in said camera to effect interlocking thereof.

References Cited

UNITED STATES PATENTS

| | | | |
|---|---|---|---|
| 1,930,315 | 10/1933 | Kobayashi | 431—93 XR |
| 2,006,171 | 6/1935 | Kalhaus et al. | 431—92 XR |
| 2,024,225 | 12/1935 | Igari | 431—93 |
| 3,096,025 | 7/1963 | Prochnow | 240—1.3 |
| 3,309,513 | 3/1967 | Aymar | 240—1.3 |

NORTON ANSHER, Primary Examiner

F. L. BRAUN, Assistant Examiner

U.S. Cl. X.R.

240—1.3; 431—93